United States Patent [19]

Horlenko et al.

[11] 3,868,410

[45] Feb. 25, 1975

[54] CONVERSION OF OLIGOMERIC ACRYLATES TO ACRYLATE MONOMERS

[75] Inventors: Theodore Horlenko; Gene J. Fisher; Adolfo Aguilo, all of Corpus Christi, Tex.

[73] Assignee: Celanese Corporation, New York, N.Y.

[22] Filed: Aug. 3, 1972

[21] Appl. No.: 277,532

[52] U.S. Cl...... 260/486 R, 260/484 R, 260/526 N, 260/638 R
[51] Int. Cl............................................. C07c 69/54
[58] Field of Search ................................ 260/486 R

[56] References Cited
UNITED STATES PATENTS
2,470,361   5/1949   Miller ................................ 260/486

FOREIGN PATENTS OR APPLICATIONS
783,073   9/1957   Great Britain .................. 260/486 R Primary Examiner—Lorraine A. Weinberger
Assistant Examiner—Paul J. Killos
Attorney, Agent, or Firm—Ralph M. Pritchett

[57] ABSTRACT

Ester-type oligomers containing up to about 3 carboxylate units in the molecule are encountered in esterifying acrylic acid with an alkanol to prepare a monomeric acrylate ester. Their formation results in a loss of chemical efficiency and they also constitute a waste-disposal problem. The present invention constitutes a method for converting such oligomers back to an industrially useful product comprising monomeric acrylate moiety, comprising heating to a specified temperature in the presence of a material which is an inhibitor against vinyl-type polymerization. The resulting monomer-containing products can be recycled to the acrylate esterification process without additional treatment or purification, with resulting increased chemical efficiency in the esterification process.

14 Claims, No Drawings

CONVERSION OF OLIGOMERIC ACRYLATES TO ACRYLATE MONOMERS

BACKGROUND OF THE INVENTION

Many processes are known in which monomeric acrylate esters are synthesized by reacting acrylic acid with an alcohol, typically in the presence of an esterification catalyst which is normally a mineral acid (such as phosphoric acid or sulfuric acid) or a sulfonic acid. The esterification is typically carried out at an elevated temperature, e.g., about 100°C, which is, nevertheless, controlled below a certain upper limit (of the order of 130°C) in order to avoid vinyl-type polymerization of acrylate moiety during the esterification process. By controlling the temperature within roughly these limits, and also by maintaining within the esterification reaction zone an effective concentration of a suitable inhibitor against vinyl-type polymerizations, it is possible to obtain high yields of the desired monomeric acrylate ester with little if any difficulty caused by vinyl-type polymerization.

However, even with the use of controlled reaction temperature and polymerization inhibitor, there is still another source of chemical inefficiency, as well as of a waste-disposal problem, in the formation of small but significant quantities of ester-type oligomers comprising acrylic acid moiety and also typically comprising some of the alcohol with which the acrylic acid is being esterified. These oligomers may contain as much as approximately 20 percent of the total acrylic acid consumed in the esterification reaction. In addition to representing an undesired loss of acrylic acid (and of alcohol) they also present a processing problem in that they must ultimately be disposed of (as by incineration). Furthermore they have an adverse effect on acrylate ester recovery (which is typically by distillation) in that, unless they are continuously purged out of the reaction system, they will build up in the system and ultimately fill it with a heavy high-boiling liquid from which recovery of the acrylate ester becomes increasingly difficult.

There is, thus, a need for a method to either prevent the formation of these oligomers or else to convert them to some useful form.

It is an object of the present invention to provide a method for converting the ester type acrylate oligomers just described into monomers which can be, for example, employed as feedstocks in the preparation of monomeric acrylate esters.

It is a particular object to provide an improved acrylic acid-esterification process in which ester-type oligomeric by-products are converted to a product comprising acrylate monomers, or a mixture of acrylate monomers and an alkanol, which is then recycled to the esterification process as a feedstock for conversion into additional quantities of monomeric acrylate ester.

Other objects will be apparent from the following detailed specification.

SUMMARY OF THE INVENTION

In accordance with the present invention, the ester-type oligomeric by-products formed during the esterification of acrylic acid with an alcohol are heated, in the presence of a material which is an inhibitor against vinyl-type polymerization, to a temperature of at least about 180°C and maintained at this temperature for a finite period of time during which, at the elevated temperature, the oligomers are thermally broken down to form a product comprising the useful monomers originally present in the esterification reaction system, e.g., acrylic acid, alcohol, and the monomeric acrylate ester of the alcohol. Surprisingly, this treatment results in very little formation of intractable tarry residues, which would ordinarily be expected to take place upon heating acrylates or the oligomers (which themselves contain reactive moieties even after the oligomerization reactions).

In a particularly preferred embodiment of the invention it is applied to an oligomer mixture formed as the residue in a still-reactor within which an alcohol is being esterified with acrylic acid to form the corresponding acrylate ester. In this embodiment the oligomeric still residue is withdrawn from the still, heated as explained above to convert the contained oligomers to monomeric acrylic acid (or a mixture comprising acrylic acid and acrylate monomer), and the resulting monomer-containing product is then returned to the still reactor for further conversion to acrylate ester or distillation of the acrylate ester formed in the heat treatment. The result is a substantial increase in the chemical efficiency of the esterification reaction, and a decrease in production of the oligomeric residue, which is otherwise of little or no value.

DETAILED DESCRIPTION AND PREFERRED EMBODIMENTS

The acrylate oligomers with which the present process is concerned comprise, broadly, ester-type compounds which are formed from acrylic acid in the course of esterifying acrylic acid with an alcohol, typically an alkanol having from 1 to about 10 carbon atoms, especially a lower alkanol having up to about 8 carbon atoms, including n-butanol in particular. These oligomers, as already noted, are ester-type condensation products rather than vinyl-type low polymers, and they are typically formed in the course of esterifying acrylic acid with an alkanol in the presence of a material which is an inhibitor against vinyl-type polymerization in accordance with practices known in the art. Their formation is believed to be especially characteristic of systems in which free acrylic acid is present, e.g., direct acrylic acid esterifications, as compared with transesterification systems in which there is no substantial concentration of the free acid.

Typical acrylate oligomers formed in such circumstances comprise at least one member of the following group:

An acrylic acid dimer:

(I) 

An acrylic acid trimer:

(II) 

III. Esters of I and II above with the alkanol being employed in the esterification process, and IV. Alkoxy-substituted compounds of the formula:

where R is an alkyl group corresponding to the alkanol being employed in the esterification process and n is an integer of 1 to 10 typically 1 to 4.

It will be understood that the alkanol used in the esterification and contributing alkyl moiety to the oligomers depicted above can in fact be other than a simple alkanol; that is, it may be an alicyclic alcohol such as cyclohexanol or an aromatic-substituted alcohol such as benzyl alcohol. Typically, however, simple alkanols will be employed in prepared monomeric acrylate esters, and their oligomer derivatives will normally be those which are encountered industrially and therefore particularly relevant in the present process.

Applicability of the present process to converting the oligomers described above to industrially useful monomeric products is not restricted by the nature of the esterification process of which the oligomers are a by-product. Typically, however, acrylate esterifications are conducted at temperatures between about 90°C and 130°C and in the presence of an acidic esterification catalyst. Typically the catalyst is dissolved in the liquid esterification reaction mixture and comprises a member of the group consisting of mineral acids and sulfonic acids, more commonly a member of the group consisting of sulfuric acid or phosphoric acid and any of a large number of sulfonic acids. The sulfonic acids, including a particularly p-toluene-, benzene-, and methyl sulfonic acids, are particularly useful and are employed normally in a concentration of at least about 0.5 percent by weight, typically about 1 to 3 percent by weight.

As previously mentioned the esterification is also normally carried out in the presence of a material which is an inhibitor against vinyl-type polymerization in order to avoid product loss, and apparatus fouling, due to vinyl-type polymerization of the acrylic acid and/or acrylate ester. Particularly useful polymerization inhibitors include hydroquinone, phenothiazine, and p-methoxyphenol, although the present process is also applicable in processing oligomeric by-products resulting from esterifications in which other inhibitors of vinyl polymerization are employed.

With the exception of the type of reaction system employed in the esterification, the relation of which to the present process will be explained below, other details of the esterification reaction are not pertinent to the present invention. For example, the oligomeric by-products are formed regardless of whether acrylic acid or alcohol is in stoichiometric excess in the esterification reaction vessel. Esterification reaction pressure is not relevant, although it is typically maintained high enough to maintain a liquid phase in the reactor. Esterification reaction time is also not pertinent; it will in any event be long enough to provide time enough for substantial conversion of acrylic acid to monomeric ester, and there will always be a finite amount of oligomeric material formed as the acrylate monomer is formed.

Concerning the apparatus employed in the esterification system, simple heated kettles (typically fitted with reflux condensers by means of which the reaction temperature can be controlled by condensing evolved alcohol vapors and returning the condensate to the reaction vessel) can be employed, normally operating batchwise. Particularly useful esterification reactors, however, consist of still reactors, operating either batchwise or continuously but advantageously continuously. A typical still reactor comprises a distillation column surmounting a reaction vessel provided with a reboiler or a simple heating jacket. Acrylic acid and the alcohol are fed, batchwise if desired but preferably continuously, into either the column or the reaction vessel along with esterification catalyst and polymerization inhibitor. Normal practice is to introduce at least a portion of the inhibitor into the head of the column and into the condenser, as well as into the reaction vessel proper. The acrylate monomer product, typically as the water azeotrope or water-alkanol-ester azeotrope, is withdrawn from the head of the column while it is withdrawn from the base of the column, comprising high-boilers including the oligomers, is withdrawn from the base of the column either continuously or intermittently along with accumulated inhibitor and esterification catalyst.

When the esterification is conducted in a simple kettle-type reactor, the alcohol, acrylic acid, catalyst, and polymerization inhibitor are normally charged to a heated vessel equipped with a condenser and condensate-collection system. As the esterification reaction proceeds, reaction products including acrylate monomer are distilled out of the vessel, condensed, and subsequently redistilled to separate the acrylate monomer product from water and excess alcohol. At the conclusion of the esterification reaction cycle, an oligomer-containing residue remains in the kettle, having a composition qualitatively similar to that of the residue resulting from carrying out the reaction in a continuous still-type The reaction residue resulting typically from use of a continuous still-type reactor typically comprises, by weight, approximately 20 to 30 percent oligomers, 15 to 35 percent acrylate monomer, 30 to 45 percent acrylic acid, 3 to 5 percent free alcohol, 2 to 3 percent esterification catalyst, and 2 to 3 percent polymerization inhibitor. In a batch kettle, the residue contains less free acid and more ester. It will be recognized that this is subject to substantial variation depending upon the molecular weight of the alcohol, the concentration of catalyst and inhibitor which have been employed, and the degree of stripping of volatile components from the residue which has been carried out (the degree of stripping being largely a matter of choice, application of the present process making possible a relatively light degree of stripping inasmuch as residue, in the present process, is recovered and does not constitute an irrevocable loss). Advantageously, it is preferred to strip the residue of volatile components until it contains, by weight, at least about 20 to 30 percent high-boiling acrylate oligomers of the types previously described. Typically the residue contains at least about 2 weight percent of polymerization inhibitor (typically phenothiazine or hydroquinone) and about 2 percent of esterification catalyst (typically an alkyl or aryl sulfonic acid). This is more than sufficient for the prevention of vinyl-type polymerization when the residue is, in accordance with the present invention, subsequently heat-treated to convert the contained oligomers to monomeric compounds. More particularly, it is recommended that during the heat treatment the oligomer-containing material being treated contain a concentration of at least about 500 parts per million of polymerization inhibitor. There is no adverse effect from using much higher inhibitor concentrations. Polymerization inhibitors typically employed in the esterification process and which can also be employed in the heat-treating process of the present invention include hydroquinone, phenothiazine, and p-methoxy phenol. A particularly useful inhibitor is hydroquinone.

In applying the present invention to the conversion of the esterification residue to monomeric compounds which can be subsequently re-employed as esterification reaction feedstock, the esterification residue is advantageously simply drawn from the base of the esterification reactor and, containing the esterification catalyst and polymerization inhibitor which are already present, heated to at least about 180°C for a finite period of time and preferably under sufficient pressure that substantially the entirety of the material being heated is kept in the liquid phase. Some flashing can be allowed to occur if desired, but this is not preferred; in such event it is recommended that any vapors being allowed to flash off be immediately condensed in the presence of additional quantities of a vinyl polymerization inhibitor. Preferably the oligomers are heated to a temperature between about 200°C and about 250°C, in the liquid phase, for a period of at least about 1 to 2 minutes and preferably for from 2 to 10 minutes. Conversion per pass is, of course, a positive function of temperature and of residence time per heating pass.

During the heating step the oligomer-containing material is converted at least in part to free acrylic acid and monomeric acrylate ester. Alcohol formed in the thermal breakup of the oligomers is largely converted immediately to monomeric ester by reaction with the acrylic acid which is present.

Although the heat-treated product can, if desired, be separated into its several components such as monomeric ester, alcohol, acrylic acid, and unconverted oligomers, for example by distillation, it is particularly preferred to return the material directly to the esterification reactor as feedstock for further conversion to, and recovery of, monomeric acrylate ester. This dispenses with the need for separate distillation of this material and also renders unnecessary the taking of steps to control the heat-treating process as closely as would be desirable if the material were not returned to the esterification reactor. That is, it becomes possible to adjust the temperature of the heat-treating process from time to time as necessary to prevent continuing buildup of oligomeric process residue while at the same time allowing substantial fluctuation in the conversion of oligomers per pass through the heat-treating operation. This also has the very great advantage of reducing the consumption of esterification catalyst and polymerization inhibitor in the esterification process, inasmuch as these materials are recycled to the esterification reactor with the heat-treated oligomer residue stream instead of being discarded.

In recycling the heat-treated material to the esterification reactor, no particular special techniques are necessary. The material is simply introduced into the base of the esterification reactor or, if desired, onto one of the plates of the distillation column if the esterification reaction is being carried out in a still-reactor equipped with a column. When the esterification is being carried out in a simple kettle reactor, the heat-treated oligomeric residue is most conveniently incorporated into a subsequent esterification reaction batch.

It is particularly recommended, however, to carry out the esterification in a continuously-operating still-reactor surmounted by a continuously-operating distillation column through which the acrylate product is continuously distilled out as it is formed, with the heat treatment being applied to a stream continuously withdrawn from the base of the column with the heat-treated material being then reintroduced into the base of the column.

The heat treatment itself can either be carried out batchwise, as by simply elevating the temperature obtaining within a simple kettle-type reaction reactor after the acrylate product has been substantially entirely removed in the course of the esterification cycle, or else it can be carried out continuously in conjunction with a continuous esterification process (which is preferable). The preferred continuous treatment is applied by pumping the esterification residue through a heat exchanger, within which it is heated to the recommended temperature of at least about 200°C and under sufficient pressure to keep the material in the liquid phase, and then maintaining the material, still at a temperature of at least about 200°C, for a finite period of time as explained above prior to reintroducing it into the esterification reactor. It is possible to obtain the desired retention time at reaction temperature by employing, for the heating step, a heat exchanger which is large enough to have the desired retention time. Alternatively, if the heat exchanger is not large enough to provide sufficient retention time, the heat exchanger effluent is passed through a simple elongated vessel which does provide adequate retention time. This vessel can be a cylinder, a baffled tank, or a length of insulated and/or heated piping connecting the heat exchanger with the esterification reactor.

As previously mentioned, the heating temperature may be somewhat less than 200°C and the retention time may be somewhat less than one or two minutes, at the expense of a reduced conversion per pass in the heat-treatment step. Appreciable conversion will occur, for example, at temperatures as low as about 180°C and at retention times of 10 minutes or less (at this low temperature). At temperatures above about 200°C, appreciable conversion is obtained at heat-treatment retention times of even less than 1 minute.

The following examples are given to illustrate the invention further; it will be recognized that many departures therefrom can be made within the scope of the invention.

EXAMPLE I

From an esterification reactor in which n-butanol had been reacted with acrylic acid to form butyl acrylate there had been obtained, after removal of a part of the butyl acrylate and unreacted butanol, a high-boiling residue which contained, by weight, approximately 36 percent butyl acrylate, 36 percent free acrylic acid, 1 to 4 percent free n-butanol, 8 percent of the acrylic acid dimer (I) described previously herein, 18 percent of the n-butyl esters of the dimer (I) and trimer (II), and 1.5 percent of the butoxybutyl dimer (IV) as described previously hereinabove. Also present were approximately 2 weight percent of p-toluene sulfonic acid, which had been employed as catalyst in the esterification, and 2 percent of hydroquinone, an inhibitor against vinyl polymerization which had also been employed in the acrylate esterification process.

The mixture just described was heated to 220°C during a period of about 2 minutes and was then kept at this temperature for an additional period of about 8 minutes. During the heating and subsequent retention, sufficient pressure was maintained to prevent vaporization of any of the materials being heated; this was approximately 4 atmospheres absolute.

The heat-treated material was then cooled to approximately 20°C and analyzed by chromatographic methods. It was found that, after this heat-treating operation, the resulting product contained, by weight, approximately 38 percent monomeric acrylic acid, 1 percent n-butanol, 44 percent monomeric butyl acrylate, and 16 percent unconverted oligomeric materials.

EXAMPLE II

From an esterification reactor in which n-butanol had been reacted with acrylic acid to form butyl acrylate there had been obtained, after removal of part of the butyl acrylate and unreacted butanol, a high-boiling residue which contained, by weight, approximately 40 percent butyl acrylate, 32 percent free acrylic acid, 1 to 4 percent free n-butanol, 5 percent of the acrylic acid dimer (I) described previously herein, 13 percent of the n-butyl esters of the dimer (I) and trimer (II), and 1.3 percent of the butoxybutyl dimer (IV) as described previously hereinabove. Also present were approximately 2 weight percent of p-toluene sulfonic acid, which had been employed as catalyst in the esterification and 2 percent of hydroquinone, an inhibitor against vinyl polymerization which had also been employed in the acrylate esterification process.

The mixture just described was heated to 250°C during a period of about 1 minute and was then kept at this temperature for an additional period of about 4 minutes. During the heating and subsequent retention, sufficient pressure was maintained to prevent vaporization of any of the materials being heated; this was approximately 7 atmospheres absolute.

The heat-treated material was then cooled to approximately 20°C and analyzed by chromatographic methods. It was found that, after this heat-treating operation, the resulting product contained, by weight, approximately 40 percent monomeric acrylic acid, 1 percent n-butanol, 40 percent monomeric butyl acrylate, and 10 percent unconverted oligomeric materials.

EXAMPLE III n-Butanol and acrylic acid were esterified continuously in a still-type reactor comprising a reaction kettle surmounted by an azeotropic distillation column 100 millimeters in diameter containing 35 plates and fitted with a reflux condenser and a distillate receiver fitted to operate as a decanter for separating an organic ester product phase from an aqueous phase containing also small quantities of butyl acrylate and n-butanol. The column was operated at approximately 300 millimeters of mercury absolute head pressure. The base temperature, i.e., the temperature in the reaction kettle which was surmounted by the column just described and which was provided with a heated reboiler, was approximately 100°C.

The column was operated to distill overhead butyl acrylate, n-butanol, and water, and the total column overhead product was measured and analyzed chemically. It contained 457 grams per hour of n-butyl acrylate and 187 grams per hour of n-butanol.

The esterification feedstock was introduced continuously into the base of the column, i.e., into the reaction kettle which was surmounted by the column, and amounted to 516 grams per hour of n-butanol and 395 grams per hour of glacial acrylic acid.

Within the kettle at the base of the column there was continuously maintained a concentration, by weight, of approximately 2 percent of methyl sulfonic acid. A vinyl-type polymerization inhibitor, hydroquninone, was continuously introduced into the head of the column in the form of 100 grams per hour of a 2.3 percent solution of this inhibitor in water.

With the column operating in this manner and without the benefit of the present invention there was continuously drawn off a high-boiling residue amounting to approximately 155 grams per hour and containing, chemically bound as dimeric and trimeric oligomers, approximately 9.3 percent of the acrylic acid initially fed and 2.7 percent of the n-butanol initially fed. The residue also contained, in the form of monomers, approximately 2.3 percent of the acrylic acid initially fed and 3 percent of the n-butanol initially fed. These monomers, partly free acid and alcohol and partly monomeric butyl acrylate, were theoretically recoverable from the residue but would have required specialized processing, e.g., gas stripping, for separation from the oligomeric materials. By weight, the composition of this drawn-off residue was approximately 29 percent oligomers, 47 percent monomeric acrylic acid, 5 percent n-butanol, 17 percent butyl acrylate, 4 percent water, 2 to 3 percent methyl sulfonic acid, and 2 to 3 percent hydroquinone.

EXAMPLE IV

The same reaction system described in Example III was employed but with the addition of a distillation residue heat-treating system which comprised (a) means for continuously pumping a residue stream from the esterification kettle through a heater wherein the drawn-off stream was heated to a controlled temperature, (b) a cylindrical vessel wherein the drawn-off and heated residue could be kept at the controlled temperature for a controlled period of time, and (c) a connection for returning the heat-treated material from the retention vessel back to the esterification reaction kettle. That is, a residue stream drawn off from the reaction kettle was pumped through a heat exchanger, thence through a retention vessel, and thence back into the esterification reactor.

n-Butanol was fed to this reaction system, as in Example III above, at 624 grams per hour; acrylic acid was fed at 482 grams per hour, and organic distillate was produced at 936 grams per hour.

The residue in the esterification reactor, which contained, by weight, about 28 percent oligomers, 42 percent monomeric acrylic acid, 3 percent n-butanol, 18 percent butyl acrylate, 3 percent, 2 percent methyl sulfonic, and 2 percent hydroquinone, was withdrawn at 1800 grams per hour and pumped through the residue heater, within which it was heated to approximately 230°C. Upon leaving the heater the heated material was passed through the retention vessel, which was sized to provide approximately 10 minutes retention time and within which the pressure was maintained at approximately 7 atmospheres absolute. From the retention vessel the heat-treated material was then returned to the esterification reactor.

To prevent uncontrolled buildup of solids in the reaction kettle there was continuously drawn off therefrom, in addition to the 1,800 grams per hour of residue mentioned above, a purge stream amounting to 57 grams per hour.

With the esterification still-reactor and residue heat-treatment system operating in this manner, chromatographic analysis of the treated material leaving the retention vessel and being returned to the esterification reactor indicated that it contained, by weight, approximately 1 percent n-butanol, 42 percent monomeric acrylic acid, 30 percent monomeric butyl acrylate, and 20 percent acrylate oligomers which had not yet been converted to monomeric materials. The monomeric butyl acrylate recovered in the distillate withdrawn from the head of the distillation column amounted to 770 grams per hour as compared with 457 grams per hour observed in Example III with the residue heat treatment was not being employed. The net make of oligomers was 16 grams per hour, as compared with 45 grams per hour of oligomers in Example III. Of the total acrylic acid fed to the reaction system, approximately 88 percent was recovered from the head of the column as monomeric butyl acrylate, whereas without the residue heat treatment only 67 percent was so recovered (in Example III).

Of the n-butanol initially fed into the reaction system, 72 percent was recovered from the head of the distillation column as n-butyl acrylate while 23 percent was recovered as free n-butanol suitable for re-use. The process of Example III, operating without the residue heat treatment, resulted in production of a column distillate containing butyl acrylate equivalent to 52 percent of the butanol initially fed together with free butanol amounting to 36 percent of the butanol initially fed.

EXAMPLE V

From a reaction system in which 2-ethylhexanol was being esterified with acrylic acid to form 2-ethylhexyl acrylate there was produced, after processing steps which included distilling the reaction product to recover purified 2-ethylhexyl acrylate monomer, a distillation residue consisting essentially of 2-ethylhexyl acrylate, oligomers of 2-ethylhexanol and acrylic acid, and approximately 1,500 ppm of phenothiazine, which had been employed as an inhibitor against vinyl-type polymerization during the esterification process. The material contained approximately 10.8 percent by weight of monomeric 2-ethylhexyl acrylate with substantially the entirety of the remaining material being oligomers.

To the distillation residue just described there was added approximately 2 percent by weight of benzene sulfonic acid, and the material was then heated to 230°C and retained at this temperature for 10 minutes under a pressure of approximately 7 atmospheres absolute.

At the end of the heating period the resulting heat-treated material was analyzed; it was found that, as a result of the heat treatment, the monomeric 2-ethylhexyl acrylate content had increased to 30.5 percent by weight and that there was also present because of the heat treatment approximately 1.5 percent by weight of free 2-ethylhexanol. The heat-treated material was suitable for reincorporation into the mixture of alcohol and acrylic acid being employed as feedstock in the esterification process.

Results similar to those described above were obtained when 1 percent of benzene sulfonic acid, as distinguished from 2 percent, was incorporated into the material prior to the heat treatment, but the conversion of oligomer to monomer was somewhat less than when 2 percent benzene sulfonic acid was employed. Specifically, the heat-treated material in this case contained 21.0 percent monomeric ester as compared with 30.5 percent.

The embodiment of the invention in which an exclusive property or privilege is claimed are defined as follows:

1. In an esterification process wherein acrylic acid is esterified with an alkanol of from 1 to about 10 carbon atoms to form an ester of acrylic acid with said alkanol, said process being characterized by the formation of oligomeric by-products comprising at least one member of the group consisting of:

(I) 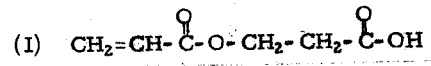

(II) 

III. Esters of (I) and of (II) with said alkanol, and (IV) 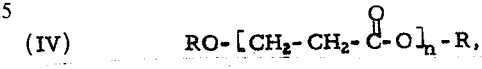

wherein R is an alkyl group corresponding to said alkanol and n is an integer from 1 to 10, the improvement which comprises:

converting said oligomeric by-products to a product comprising at least one member of the monomer group consisting of acrylic acid, said alkanol, and the monomeric acrylate of said alkanol by a method which comprises heating said oligomeric by-products in a liquid phase containing an effective amount of an inhibitor against vinyl-type polymerization, to a temperature of at least about 180°C.

2. The improvement of claim 1 wherein the alkanol has from 1 to about 8 carbon atoms.

3. The improvement of claim 2 wherein the alkanol is n-butanol and wherein the oligomeric by-products are heated at a temperature between about 200°C and about 250°C, under a pressure sufficient to maintain in the liquid phase substantially entirety of the material being heated, for a period of at least about two minutes.

4. The improvement of claim 3 wherein the oligomeric by-products are heated to at least about 200°C and then maintained at a temperature between about 200°C and about 250°C for a period of about 2 to 10 minutes and wherein the inhibitor is a member of the group consisting of hydroquinone, p-methoxyphenol, and phenothiazine.

5. In a process for esterifying acrylic acid with an alkanol having up to about 10 carbon atoms to form the acrylate ester of said alkanol, which process comprises (a) introducing acrylic acid and said alkanol into a still-reactor, (b) reacting said alkanol and acrylic acid in said reactor in the presence of an effective amount of a material which is an inhibitor against vinyl-type polymerization, and (c) distilling a product vapor comprising said acrylate ester out of said reactor while forming in the base of said still-reactor a residue comprising ester-type oligomers formed from acrylic acid in the course of said esterification, the improvement which comprises:

converting at least a portion of the oligomers contained in said residue to a product comprising at least one monomeric member of the group consisting of acrylic acid and said acrylate ester by a method which comprises heating said residue, in the liquid phase and in the presence of an effective amount of a material which is an inhibitor against vinyl-type polymerization, to a reaction temperature of at least about 180°C and then holding said heated residue at said reaction temperature for a reaction period of at least about 2 minutes.

6. The improved process of claim 5 including the additional step of recycling said residue, after said heating and holding steps, to said still reactor as feedstock for the preparation of additional quantities of said acrylate ester and wherein said residue is heated for at least about 2 minutes at a temperature between about 200°C and about 250°C.

7. The improved process of claim 6 wherein the inhibitor employed in said heating and holding steps is the same inhibitor employed in the esterification process.

8. The improved process of claim 7 wherein said esterification process is carried out in the presence of an acidic esterification catalyst and wherein said catalyst is present in said residue during said heating and holding steps.

9. The improved process of claim 8 wherein the alkanol is n-butanol.

10. The improved process of claim 9 wherein the esterification catalyst is a member of the group consisting of mineral acids and sulfonic acids.

11. The improved process of claim 10 wherein the inhibitor is a member of the group consisting of hydroquinone, p-methoxy phenol, and phenothiazine, and wherein, during said heating and holding steps, the inhibitor is present in the residue being treated in a concentration of at least about 500 parts per million.

12. The improved process claim 11 wherein the inhibitor is a member of the group consisting of hydroquinone and phenothiazine.

13. The improved process of claim 5 wherein the inhibitor is present in a concentration of at least about 500 parts per million.

14. The improved process of claim 13 wherein the inhibitor is present in a concentration of at least about 2 percent by weight.

* * * * *